United States Patent [19]
Aikawa et al.

[11] Patent Number: 5,884,047
[45] Date of Patent: Mar. 16, 1999

[54] COMPUTER HAVING AUTOMATIC SETTING FUNCTION OF STATIC ROUTING INFORMATION

[75] Inventors: Hideyuki Aikawa; Kenji Wakamiya, both of Kawasaki, Japan

[73] Assignee: Fujitsu Limited, Kanagawa, Japan

[21] Appl. No.: 871,635

[22] Filed: Jun. 9, 1997

Related U.S. Application Data

[63] Continuation of Ser. No. 300,924, Sep. 6, 1994, abandoned.

[30] Foreign Application Priority Data

Dec. 13, 1993 [JP] Japan .................................. 5-311531

[51] Int. Cl.$^6$ .................................................. G06F 13/00
[52] U.S. Cl. ...................................................... 395/200.68
[58] Field of Search ........................ 395/200.68, 200.69, 395/200.7, 200.71, 200.72, 200.73, 200.74; 370/401, 402, 399, 238, 252, 392, 397, 395, 255

[56] References Cited

U.S. PATENT DOCUMENTS

| | | | |
|---|---|---|---|
| 4,228,319 | 10/1980 | De Jager et al. | 179/2 |
| 4,630,233 | 12/1986 | Weppler | 364/900 |
| 4,635,189 | 1/1987 | Kendall | 364/200 |
| 4,750,150 | 6/1988 | Weppler | 364/900 |
| 4,827,411 | 5/1989 | Arrowood et al. | 364/300 |
| 4,905,233 | 2/1990 | Cain et al. | 370/94.1 |
| 4,987,536 | 1/1991 | Humblet | 364/200 |
| 5,038,398 | 8/1991 | Wills | 455/13 |
| 5,049,873 | 9/1991 | Robins et al. | 340/825.06 |
| 5,056,085 | 10/1991 | Vu | 370/60 |
| 5,088,032 | 2/1992 | Bosack | 395/200 |
| 5,182,798 | 1/1993 | Francisco | 395/200 |

FOREIGN PATENT DOCUMENTS

| | | |
|---|---|---|
| 0 426 911 | 5/1991 | European Pat. Off. . |
| 0 537 408 | 4/1993 | European Pat. Off. . |
| 0 571 261 | 11/1993 | European Pat. Off. . |
| 3-54938 | 3/1991 | Japan . |
| 5-48613 | 2/1993 | Japan . |

OTHER PUBLICATIONS

Chen et al., "View Interpolation for Image Synthesis," *Computer Graphics Proceedings*, Annual Conference Series, 1993, ACM–0–89791–601–8/93/008/0279, pp. 279–288.

"IP routing: You can get anywhere from here", by Barry Gerber, Network Computing, 1992, n 305, 134.

"Routers: LAN Shakers and Movers", Lan Times, Oct. 26, 1992, p. 69; vol. 9, Issue 20.

"Internetworking with Smart hubs at Ungermann–Bars", Lan Times, Feb. 24, 1992, p. 30; vol. 9, Issue 3.

"Internet task force mulls plans for efficient routing", by Tom Smith, Network World, p.2, Apr. 9, 1990.

*Primary Examiner*—Moustafa M. Meky
*Attorney, Agent, or Firm*—Staas & Halsey

[57] ABSTRACT

A computer provided with a routing information collecting unit which collects the dynamic routing information flowing in the network. The collected routing information is set in the routing table as static routing information by a setting unit. The routing unit performs the routing referring to the routing table. Further, it is possible to provide an information collection timing determining unit or an information collection completion determining unit so as to determine the timing of the collection of the routing information or the completion of the collection of the information. Further, it is possible to provide an optimum route discriminating unit and a default generating unit to determine the optimum gateway and to generate the default routing information. By this, static routing information can be set automatically without human intervention and flexibly.

14 Claims, 17 Drawing Sheets

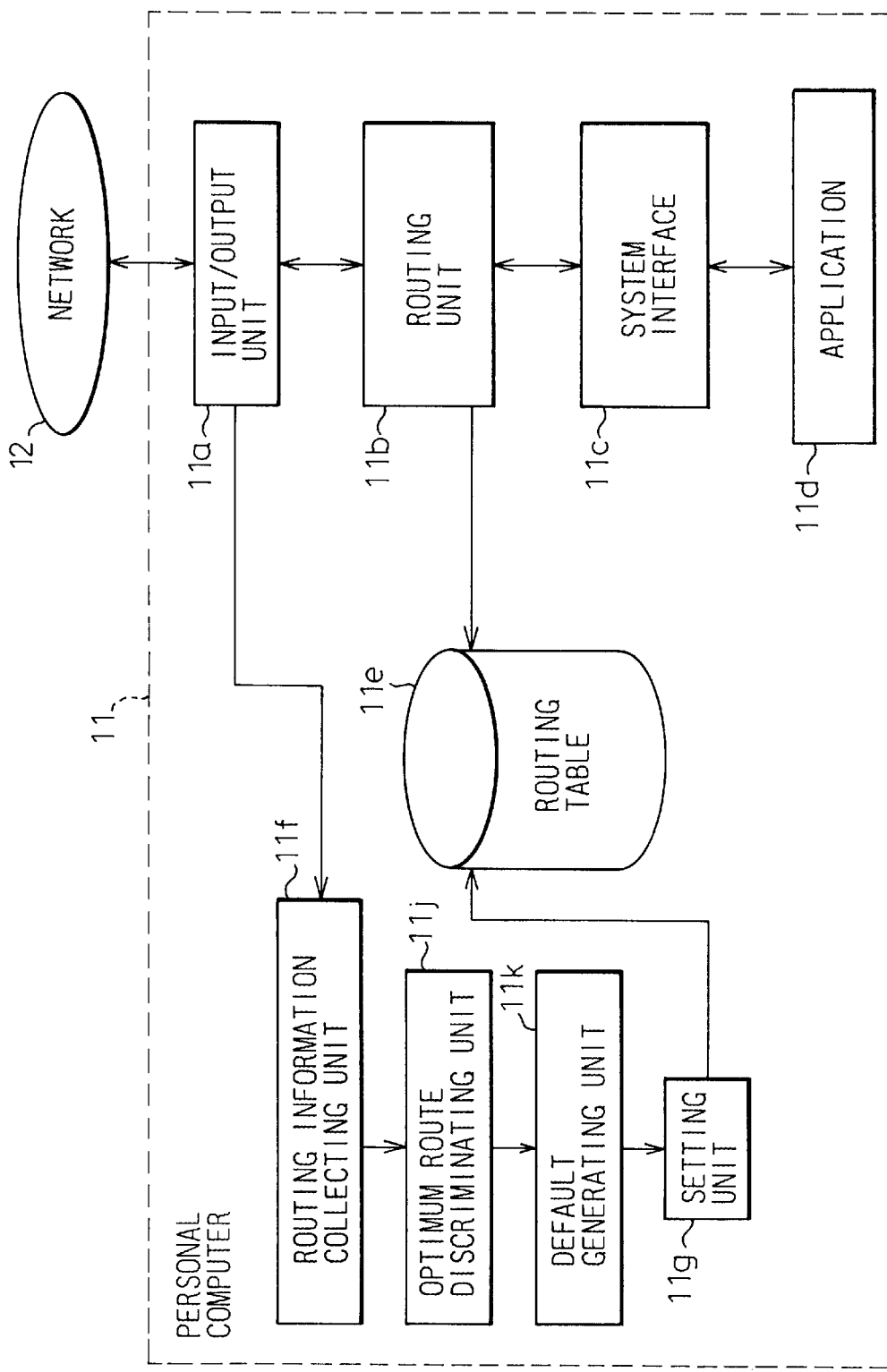

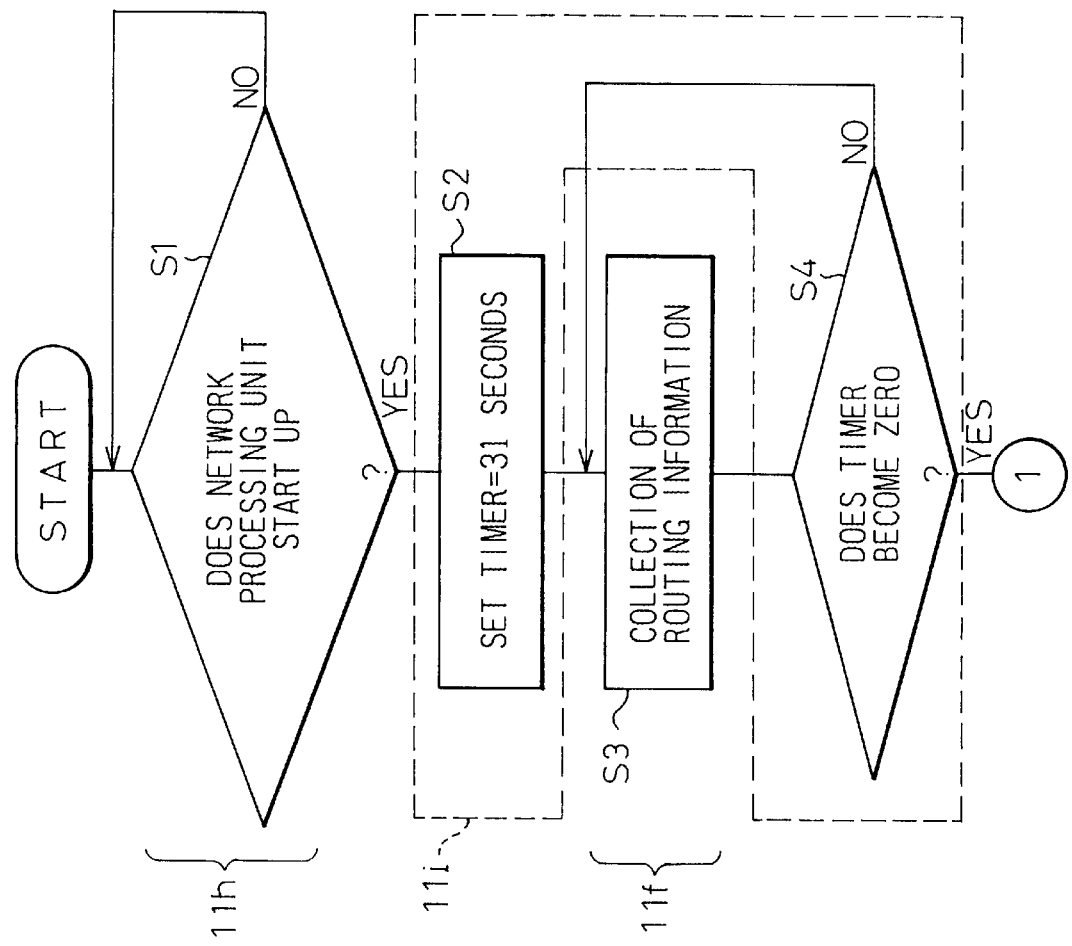

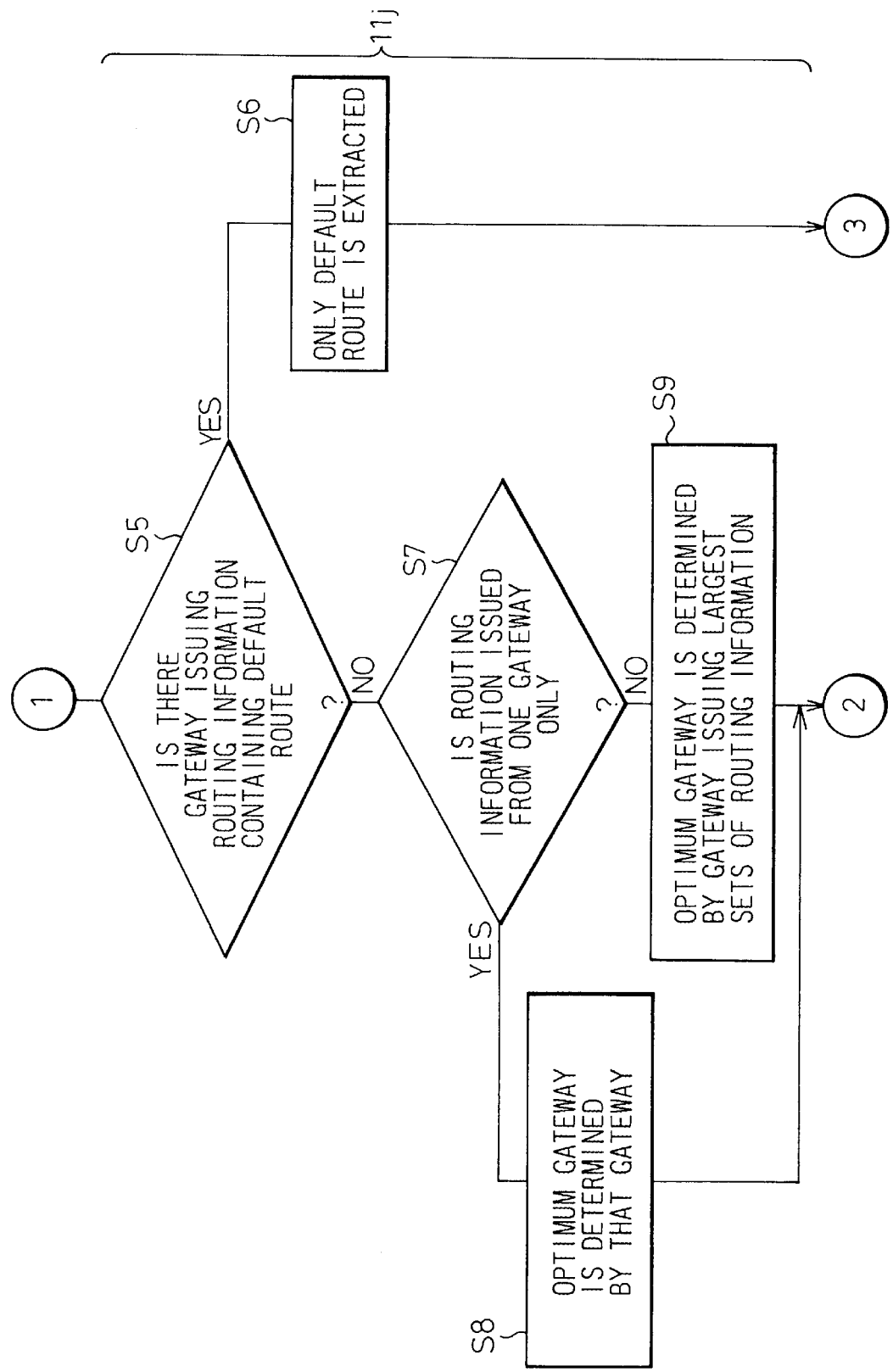

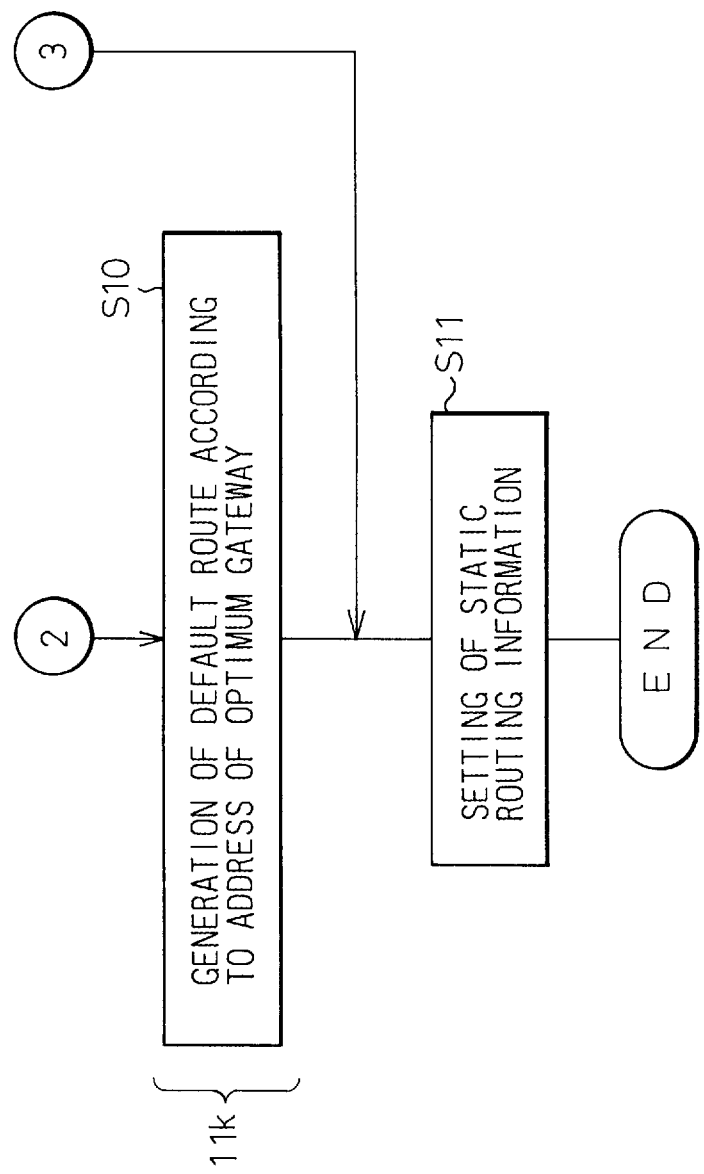

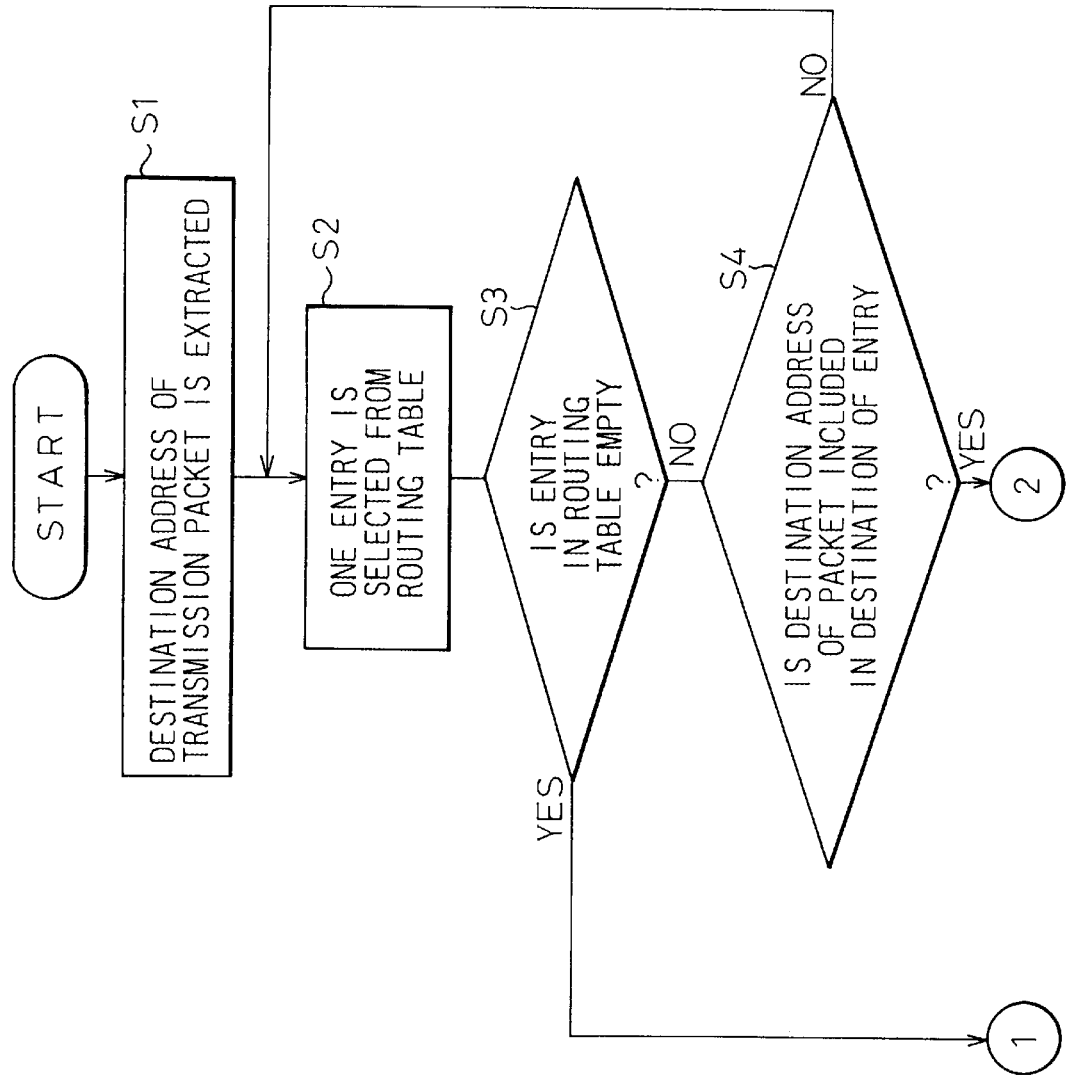

COMPUTER HAVING AUTOMATIC SETTING FUNCTION OF STATIC ROUTING INFORMATION

This application is a continuation of application Ser. No. 08/300,924, filed Sep. 6, 1994, now abandoned.

BACKGROUND OF THE INVENTION
1. Field of the Invention

The present invention relates to a computer having a function of automatically setting routing information in the case of connection to a computer network wherein routing information is used to connect and perform communication among computers, more particularly relates to a computer having the function of automatically setting routing information in the case where it is necessary to set the routing information statically.

2. Description of the Related Art

As will be explained later with reference to the drawings, the following methods have been known for setting routing information: (1) the dynamic routing method wherein the routing information flowing in the network is picked up and successively reflected back into a routing table and (2) the static routing method wherein the routing information is set manually.

The above method of setting dynamic routing information has the advantage of enabling a prompt adaptation to changes of the configuration of the network since the route information protocol (rip) information flowing in the network is successively picked up and reflected back into the routing table.

On the other hand, the method of setting static routing information has the advantage that once the routing information is set, there is no need to be concerned about changes in the routing information, so the load on the computer is lighter and even if the routing information becomes disturbed due to a fault in the network, the computer is not affected much by it.

In the above method of setting dynamic routing information, however, the computer has to continue picking up the routing information flowing in the network, so there is the problem that the load on the computer becomes larger.

Further, in the above method of setting static routing information, it is necessary to set the routing information manually, so there is the problem of the trouble taken in setting the information. Further, there is the problem that it is not easy to adapt to changes in the network configuration.

SUMMARY OF THE INVENTION

The present invention is made in consideration of the above problems in the conventional methods of setting routing information and has as its object to provide a computer having an automatic setting function of routing information which enables automatic setting of static routing information without human intervention and enables an automatic change of the setting of the routing information even after one setting if the network to which the computer is connected changes, thereby freeing the computer from the load caused in setting of dynamic routing information and yet enabling setting of the routing information with the same degree of flexibility as with setting of dynamic routing information.

To attain the above object, the computer is provided with a routing information collecting unit which collects the dynamic routing information flowing in the network. The collected routing information is set in the routing table as static routing information by a setting unit. A routing unit performs the routing referring to the routing table. Further, it is possible to provide an information collection timing determining unit or an information collection completion determining unit so as to determine the timing of the collection of the routing information or the completion of the collection of the information. Further, it is possible to provide an optimum route discriminating unit and a default generating unit to determine the optimum gateway and to generate the default routing information.

BRIEF DESCRIPTION OF THE DRAWINGS

The above object and features of the present invention will be more apparent from the following description of the preferred embodiments with reference to the accompanying drawings, wherein:

FIG. 7 is a view of a third embodiment of the present invention, FIGS. 8A, 8B, and 8C are flow charts of the processing in the third embodiment of the present invention, FIGS. 14A and 14B are flow charts of the case of expressing the routing unit 1$b$ by software.

DESCRIPTION OF THE PREFERRED EMBODIMENTS

Before describing the embodiments of the present invention, the related art and the disadvantages therein will be described with reference to the related figures.

Figure 1:
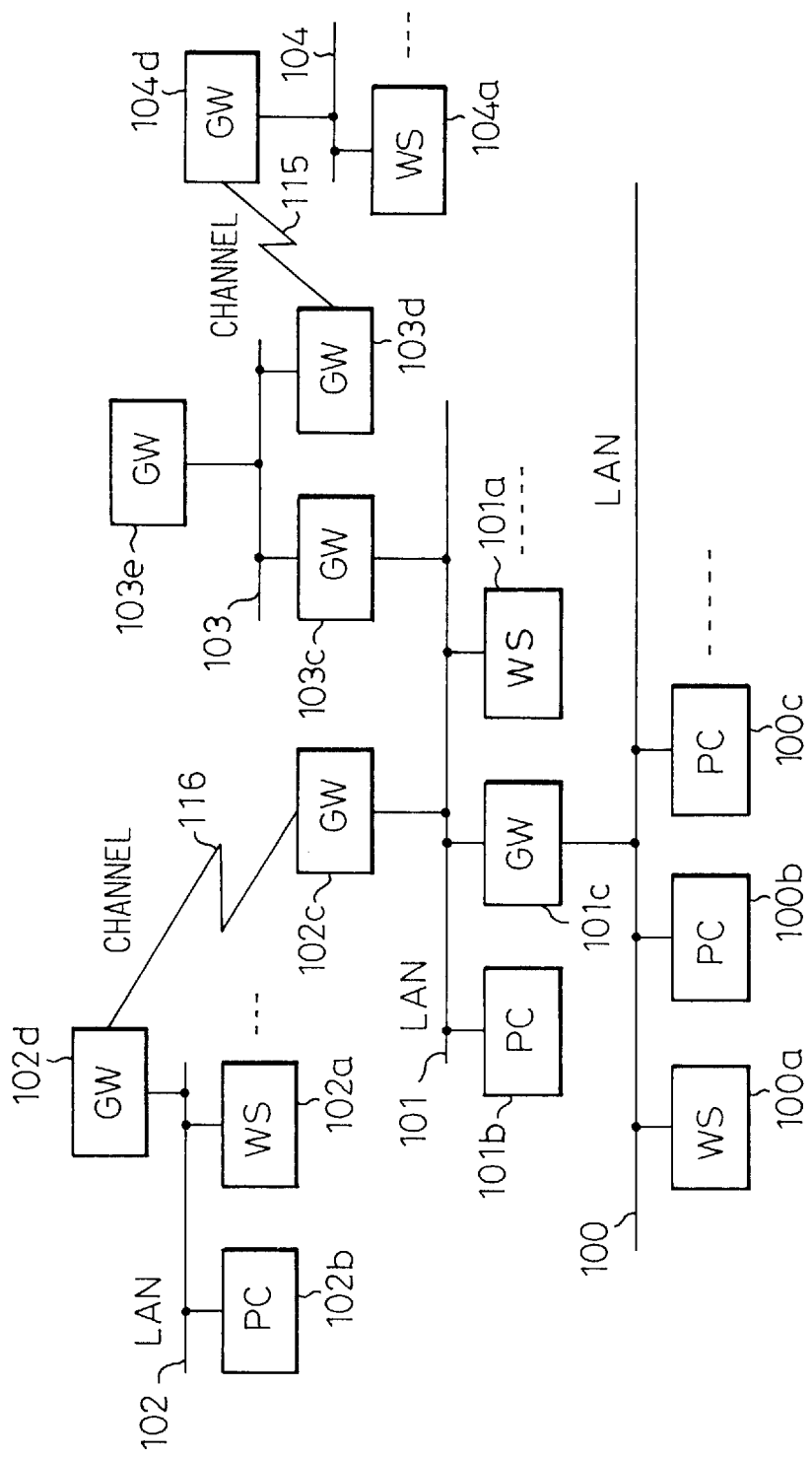
FIG. 1 is a view of an example of the general configuration of a network to which the present invention is applied.

FIG. 1 is a view of an example of the general configuration of a computer network. In the figure, reference numerals 100, 101, 102, 103, and 104 are for example local area networks (LAN's). Each LAN 100, . . . 104 has connected to it the workstations (WS) 100a, 101a, 102a, 104a and the personal computers (PC's) 100b, 100c, 101b, 102b, etc. The LAN's are connected to each other by gateways (GW) 101c, 102c, 102d, 103c, 103d, 103e and 104d and channels 116, 115, etc.

In FIG. 1, each of the workstations 100a. . . and personal computers 100b. . . are set with routing information showing which gateway to go through when communicating with other equipment. For example, the personal computer 101b connected to the LAN 101 is set with the gateway 101c for example as the routing information for connection to the LAN 100. The communication between the personal computer 101b and the LAN 100 is performed through the gateway 101c as a result.

As mentioned earlier, the following methods have been known for setting routing information: (1) the dynamic routing method wherein the routing information flowing in the network is picked up and successively reflected back into a routing table and (2) the static routing method wherein the routing information is set manually.

Figure 2:
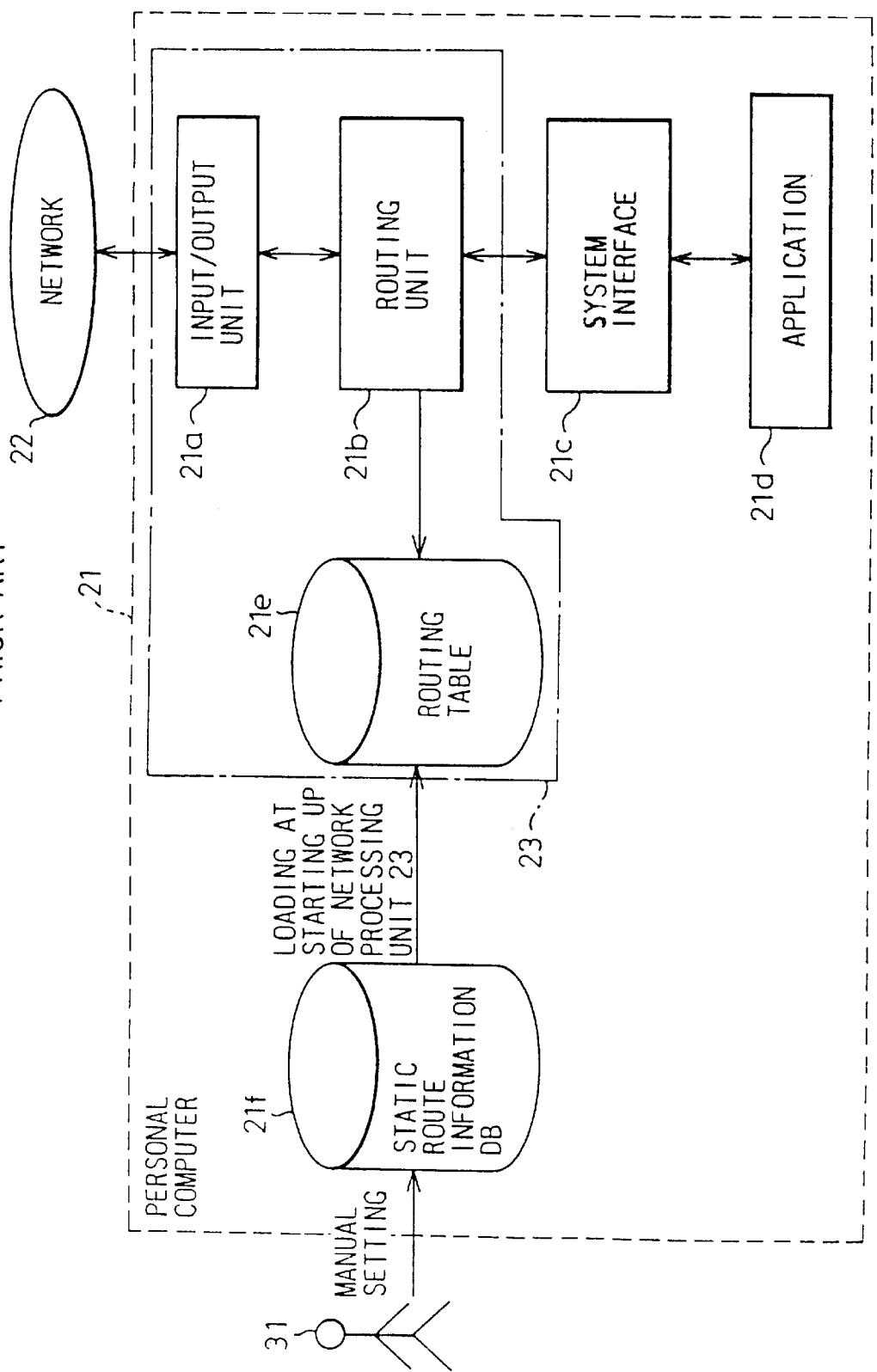
FIG. 2 is a view showing the conventional method of setting routing information.

FIG. 2 is a view of a conventional case showing the static routing method. In the figure, reference numeral 21 is a personal computer, 22 is a network, 21a is an input/output unit connecting the personal computer 21 and the network 22, 21b is a routing unit for performing routing referring to the routing table 21e when sending a pocket to the network 22, 21c is a system interface, 21d is an application program for a personal computer for actual operation for packet transmission, 21e is a routing table for storing the routing information referred to by the routing unit 21b in this way, and 21f is a static route information data base (DB) which stores the routing information set in the routing table 21e.

In the static routing method, as shown in FIG. 2, the routing information is registered in a static route information data base 21f manually in advance. That is, the routing information to all networks which it is known communication will be performed with in advance (a combination of the network number and the closest gateway for reaching the same) is obtained and registered manually in the static route information data base 21f. Usually, in the case of a personal computer, both the internet protocol (IP) address of the destination network to be communicated with and the IP address of the gateway first passed through in reaching that network are registered.

For example, the following routing information is registered in the static route information data base 21f:

| 133.161.0.0 | 133.160.39.1 | 2 |
|---|---|---|
| ... | ... | . |

Here, the above-mentioned "133.161.0.0" is the IP address of the network, "133.160.39.1" is the IP address of the gateway for reaching that network, and "2" is the "hop number" showing the number of gateways for reaching the network and corresponds to the cost of reaching the network.

When the network processing unit 23 in the personal computer 21 starts up, the routing information set in the static route information data base 21f is loaded into the routing table 21e. The routing unit 21b performs the routing referring to the routing table 21e.

In the dynamic routing method, routing information known as routing information protocol (rip) information, flowing in the network is successively received from the above input/output unit 21a. This rip information is information automatically issued every 30 seconds by the gateway connected to both the network which one is connected with and another network automatically on the network. This consists of the IP address of the other network and the cost required for reaching the same.

Receiving the rip information, the computer examines the entry in the routing table it carries itself and the entry for reaching the same destination network in the received rip information and compares the costs. The lower costing information is registered in the internal routing table. By this, it is possible to always hold the newest routing information.

The above method of setting dynamic routing information, as mentioned above, has the advantage of enabling a prompt adaptation to changes of the configuration of the network since the rip information flowing in the network is successively picked up and reflected back into the routing table, but has the problem that since the computer has to continue picking up the routing information flowing in the network, the load on the computer becomes larger.

On the other hand, the method of setting static routing information has the advantage that once the routing information is set, there is no need to be concerned about changes in the routing information, so the load on the computer is lighter and even if the routing information becomes disturbed due to a fault in the network, the computer is not affected much by it, but it is necessary to set the routing information manually, so there is the problem of the trouble taken in setting the information. Further, there is the problem that it is not easy to adapt to changes in the network configuration. Therefore, the static method of setting routing information is usually used for computers with relatively small CPU powers, such as personal computers.

As explained above, the method of setting dynamic routing information has the problem of a heavy load on the computer, while the method of setting static routing information has the problem that the routing information to all networks to be communicated with has to be known in advance and set manually. Further, as mentioned earlier, there is the problem that even after the routing information has once been set, new routing information must be set each time the network to which the computer is connected changes.

The present invention provides a computer having an automatic setting function of routing information which enables automatic setting of static routing information without human intervention and enables an automatic change of the setting of the routing information even after one setting if the network to which the computer is connected changes, thereby freeing the computer from the load caused in setting of the dynamic routing information and yet enabling setting of the routing information with the same degree of flexibility as with setting of dynamic routing information.

Figure 3:
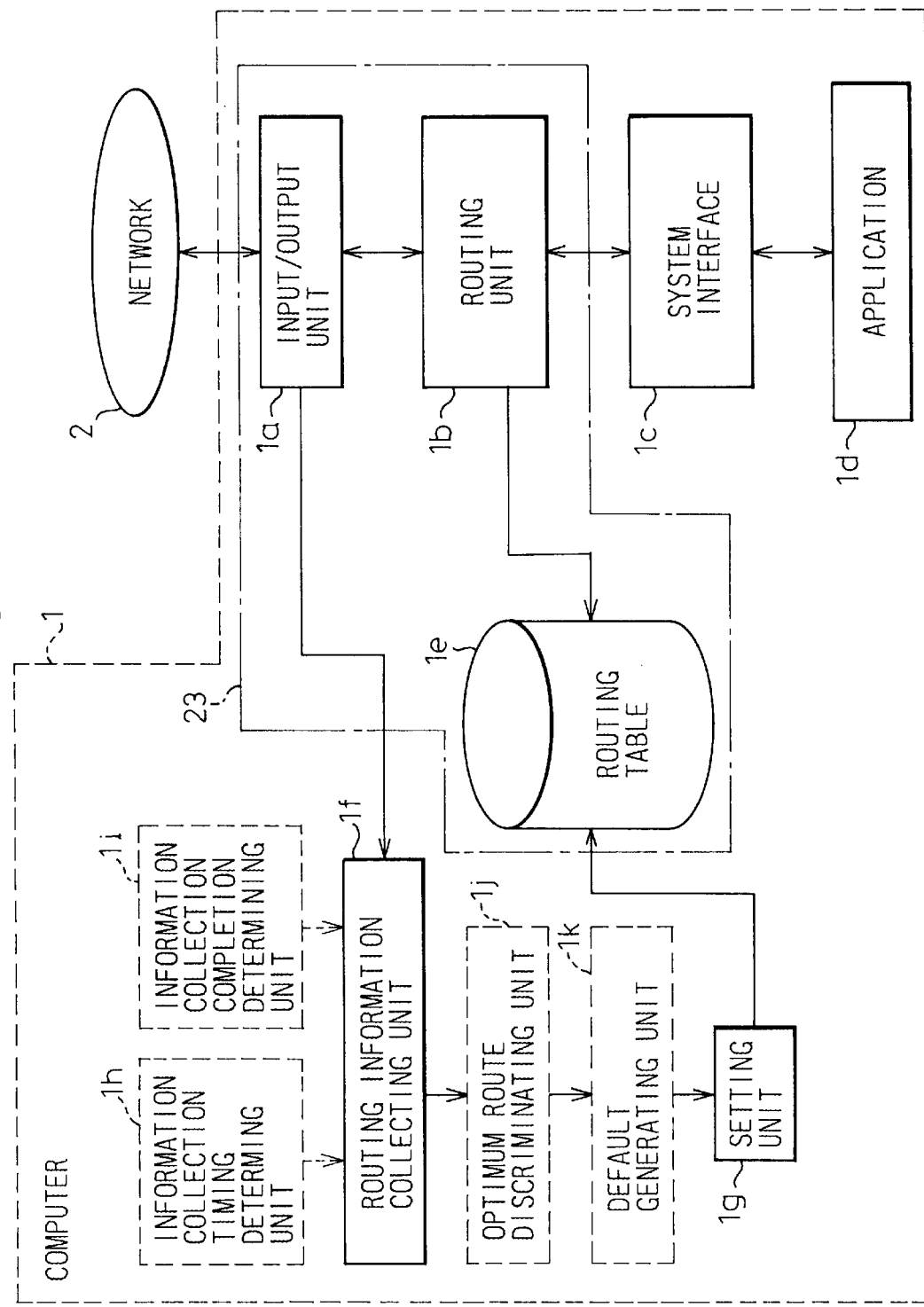
FIG. 3 is a view of the overall configuration of the present invention covering all the embodiments.

FIG. 3 is a view of the overall configuration of the present invention covering all the embodiments. In FIG. 3, reference numeral 1 is a computer, 2 is a network to which the computer is connected, 1a is an input/output unit connecting the computer 1 and the network 2, 1b is a routing unit for performing routing referring to the routing table 1e when sending a packet to the network 2, 1c is a system interface, 1d is an application program of the computer 1, and 1e is a routing table storing the routing information to which the routing unit 1b refers.

Further, reference numeral 1f shows a routing information collecting unit for collecting the routing information flowing through the network 2 through the input/output unit 1a. Reference numeral 1g is a setting unit for setting the routing information collected by the routing information collecting unit 1f in the routing table 1e. Reference numeral 1h is an information collection timing determining unit for determining the timing of collection of the routing information. Reference numeral 1i is an information collection completion determining unit for determining the completion of the collection of routing information. Reference numeral 1j is an optimum route discriminating unit for discriminating the only or optimum gateway from the network to which the computer is connected to the other network from among the read out routing information. Reference numeral 1k is a default generating unit for generating default routing information based on the optimum route information discriminated by the optimum route discriminating unit 1j.

To solve the above-mentioned problems, the first aspect of the present invention provides as shown in FIG. 3 a computer having an automatic setting function for routing information which is provided with a routing table 1e, connected to a computer network 2 which enables communication among computers by routing in accordance with routing information, and sets routing information, wherein provision is further made of a routing information collecting unit 1f and a setting unit 1g. The routing information flowing in the network is collected by the routing information collecting unit 1f. The collected routing information is set in the routing table 1e by the setting unit 1g. By this, the routing table 1e is automatically produced.

The second aspect of the present invention provides the computer of the first aspect further provided with an information collection timing determining unit 1h. The information collection timing determining unit 1h determines the timing of the collection of information and sets the routing information in the routing table 1e. By this, the routing table 1e is created automatically.

The third aspect of the present invention provides the computer of the first or second aspect further provided with an information collection completion determining unit 1i. The information collection completion determining unit 1i determines the completion of the collection of information and sets the routing information in the routing table 1e. By this, the routing table 1e is automatically created.

The fourth aspect of the present invention provides the computer of the first, second, or third aspects further provided with an optimum route discriminating unit 1j and a default generating unit 1k. The optimum route discriminating unit 1j discriminates the only or optimum gateway from the network to which the computer is connected to the other network from among the routing information which has been read so as to determine the optimum route. Based on the determined optimum route, the default generating unit 1k generates default routing information, thereby automatically creating the routing table 1e.

In FIG. 3, the routing information collecting unit 1f provided in the computer 1 collects the dynamic routing information flowing in the network 2 for just the minimum necessary number of times at the predetermined timing.

The routing information collected by the routing information collecting unit 1f is set in the routing table 1e by the setting unit 1g. The routing unit 1b performs routing for the packet to be transmitted referring to the routing information set in the routing table 1e and sends the packet to the network desired. Note that the setting unit 1g formats the collected routing information to a predetermined format and then writes it in the table 1e.

For the collection of the routing information, provision is made of the information collection timing determining unit 1h. This determining unit 1h determines the timing for collection of the routing information in the routing information collecting unit 1f. Provision is also made of the information collection completion determining unit 1i, which enables determination of the completion of the collection of information.

Further, by provision of the optimum route discriminating unit 1j and the default generating unit 1k, it is possible for the optimum route discriminating unit 1j to discriminate the only or the optimum gateway from the network to which the computer is connected to the other network and for the default generating unit 1k to generate default routing information based on the discriminated route information.

Since the first aspect of the present invention, as mentioned above, provides the routing information collecting unit 1f and the setting unit 1g, the routing information collecting unit 1f collects the routing information flowing in the network, and the setting unit 1g sets the routing information in the routing table 1e, the routing table 1e is automatically created, so it is possible to automatically set the static routing information without human intervention. Further, no large load is placed on the computer and it is possible to set the routing information with the same degree of flexibility as with the case of setting dynamic routing information.

Since the second aspect of the present invention provides the computer of the first aspect further provided with an information collection timing determining unit 1h and the information collection timing determining unit 1h determines the timing of the collection of information, the routing information can be collected at a suitable timing.

Since the third aspect of the present invention provides the computer of the first or second aspect further provided with an information collection completion determining unit 1i and the information collection completion determining unit 1i determines the completion of the collection of information, the collection of the routing information does not take too much time, the startup time of the network interface does not become longer, the same information is not read several times, and time is therefore not wasted. Further, there is no failure in collecting the necessary routing information.

Since the fourth aspect of the present invention provides the computer of the first, second, or third aspects further provided with an optimum route discriminating unit 1j and a default generating unit 1k, the optimum route discriminating unit 1j discriminates the only or optimum gateway from the network to which the computer is connected to the other network from among the routing information which has been read so as to determine the optimum route, and, based on the determined optimum route, the default generating unit 1k generates default routing information, the routing table can be made smaller.

Figure 4:
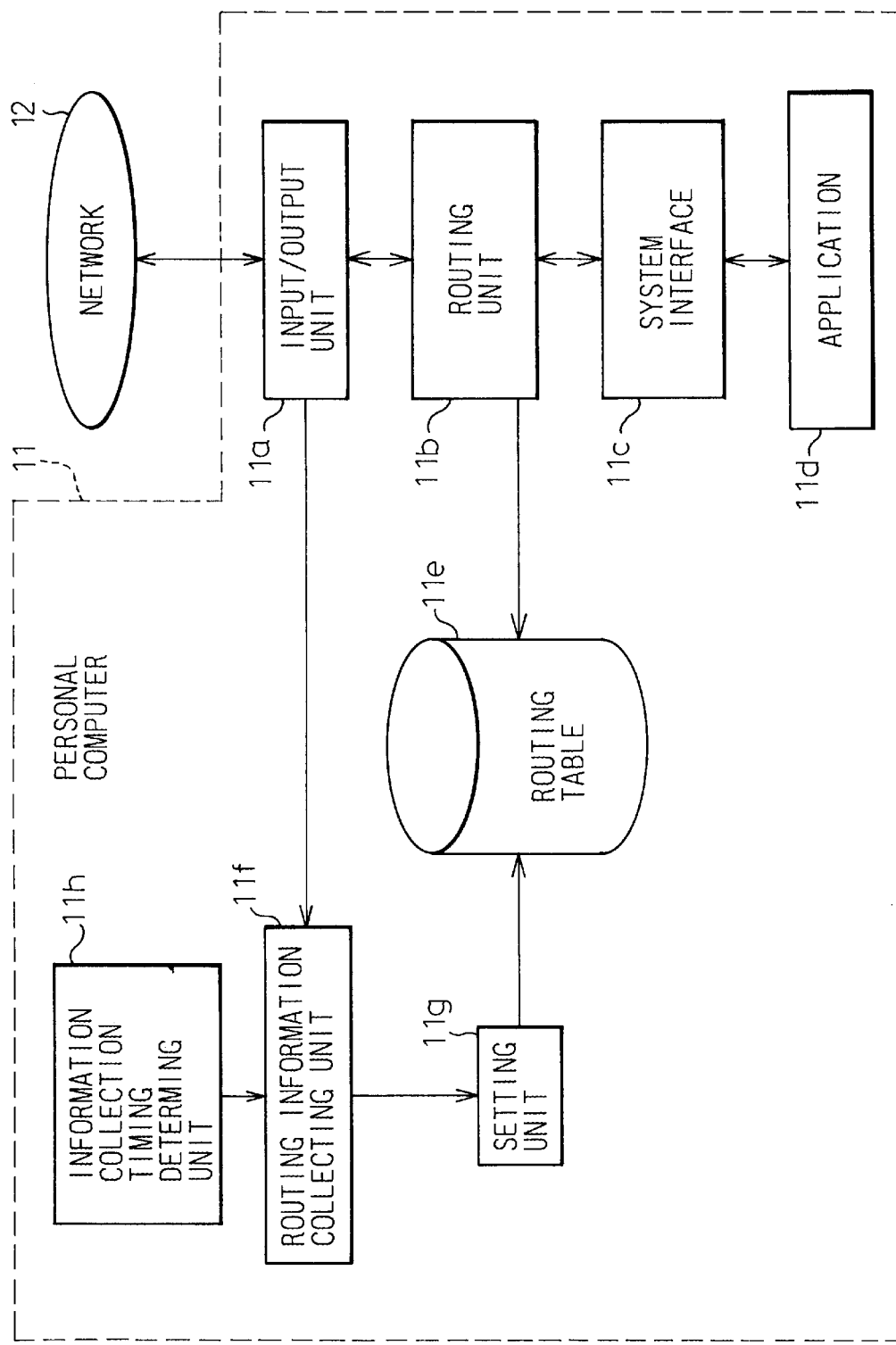
FIG. 4 is a view of a first embodiment of the present invention.

FIG. 4 is a view of a first embodiment of the present invention. In the figure, reference numeral 11 is a personal computer, 12 is a network, 11a is an input/output unit for connecting the personal computer 11 and the network, 11b is a routing unit for performing the routing for the transmission packet referring to the routing table 11e when sending the packet to the network, 11c is a system interface, 11d is an application program of the personal computer, and 11e is a routing table storing the routing information referred to by the routing unit 11b.

Further, reference numeral 11f is a routing information collection unit for collecting the rip information flowing through the network 12 through an input/output unit 11a. Reference numeral 11g is a setting unit for setting the routing information collected by the routing information collecting unit 11f in the routing table 11e. Reference numeral 11h is an information collection timing determining unit for determining the timing of the collection of the routing information.

In FIG. 4, the information collection timing determining unit 11h decides on the timing for the collection of the routing information and requests collection of the rip information to the routing information collecting unit 11f.

As the timing for the collection of the routing information, collecting information starts, for example, <1> when the power of the personal computer 11 or other computer is turned on, <2> when the network processing unit of the computer is started up, and <3> when the cable to the network is disconnected or the like and the signal showing the network is alive is interrupted and then the cable is again connected etc. and a signal showing that the network is alive is again generated.

When the information collection timing determining unit 11$h$ requests collection of rip information at the above timing, the routing information collecting unit 11$f$ collects the rip information flowing through the network 12 through the input/output unit 11$a$. The setting unit 11$g$ writes the rip information collected by the routing information collecting unit 11$f$ in the routing table 11$e$ in a predetermined format. By this, it is possible to automatically set the static routing information in the routing table 11$e$.

Figure 5:
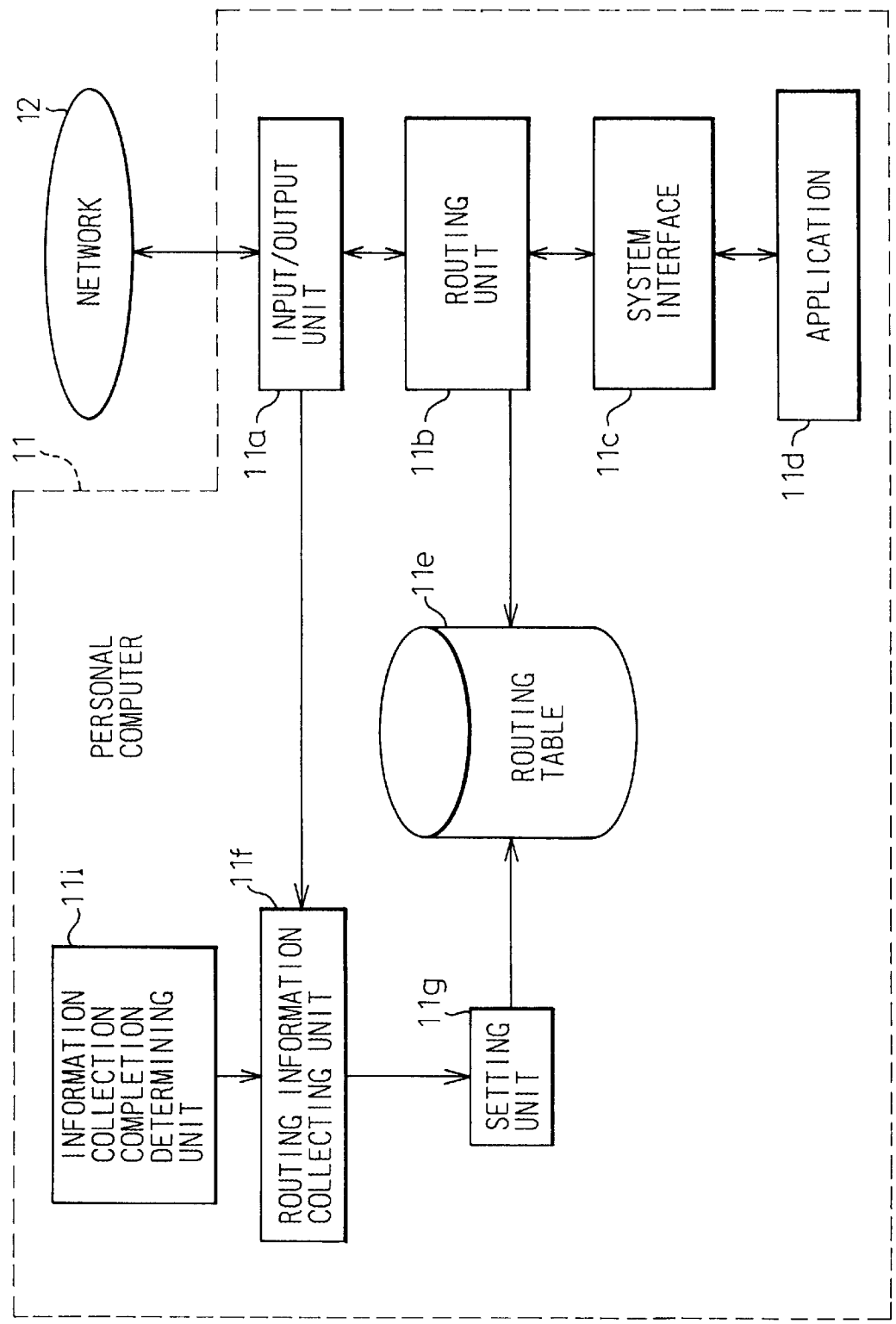
FIG. 5 is a view of a second embodiment of the present invention, FIG. 6. is a flow chart of the processing in the first and second embodiments of the present invention.

FIG. 5 is a view of a second embodiment of the present invention. The same elements as those shown in FIG. 4 are given the same reference numerals. In this embodiment, provision is made of an information collection completion determining unit 11$i$ for determining the completion of the collection of the routing information. The rest of the configuration is the same as that of the first embodiment shown in FIG. 4.

As mentioned above, however, the rip information sent out by other gateways generally is issued every 30 seconds, so when the routing information collecting unit 11$f$ collects the rip information, if the time taken for collection is too short, the necessary rip information fails to be collected. Conversely, when too much time is taken for the collection, the time for the network processing unit to start up becomes longer and the same information is read several times.

The information collection completion determining unit 11$i$ is provided to prevent this problem. For example, it determines the time for collection of the routing information in the routing information collecting unit 11$f$ in the following way:

<1> It has the routing information collected for a time, for example, 31 seconds, just slightly longer than the 30 second transmission interval of rip information.

<2> It waits until just one rip packet is read.

The rest of the operation is similar to that of the first embodiment. Based on the requests from the information collection completion determining unit 11$i$, the routing information collecting unit 11f collects the rip information flowing in the network through the input/output unit 11$a$. The setting unit 11$g$ writes the collected rip information in the routing table 11$e$ in a predetermined format.

Figure 6:
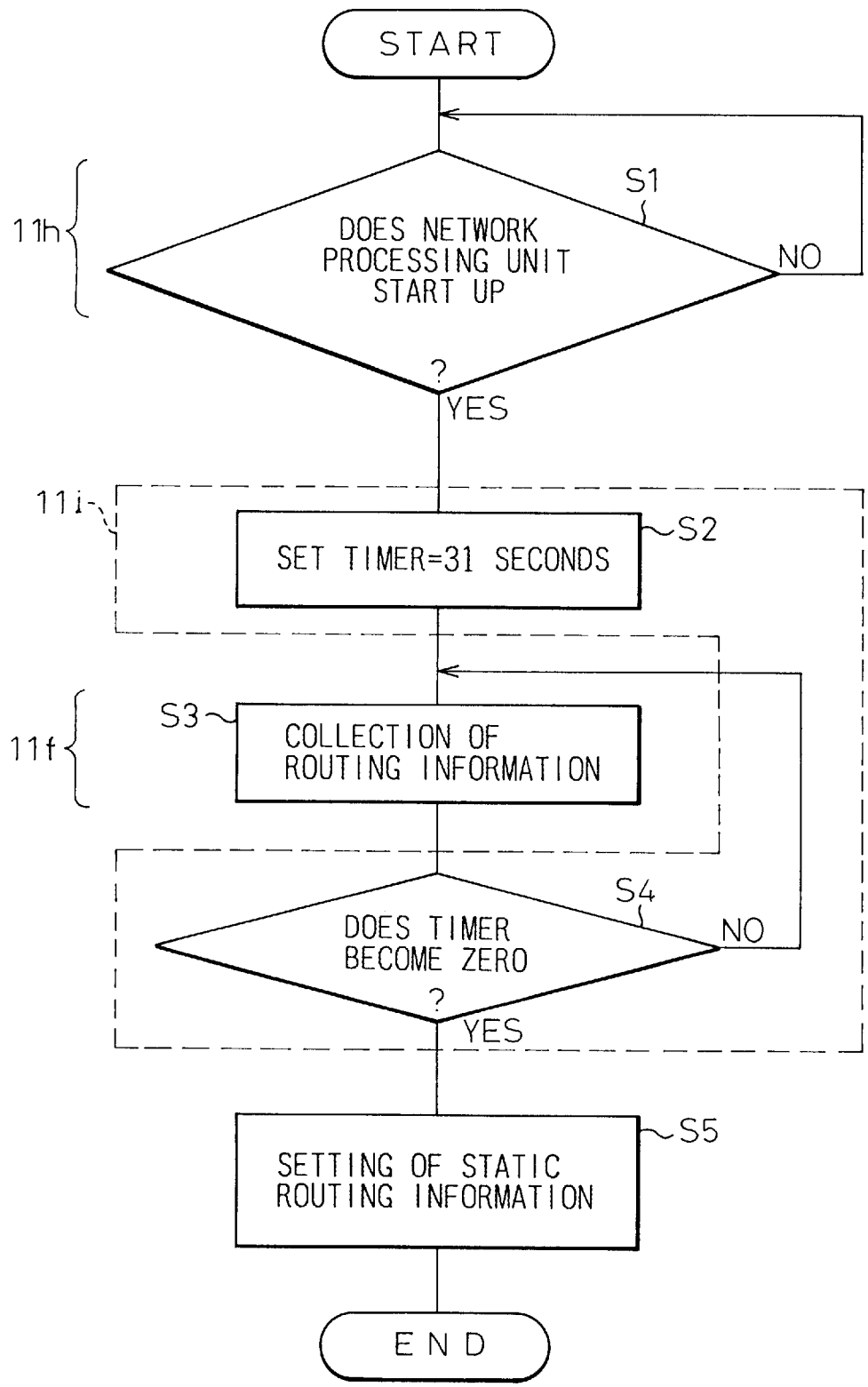

FIG. 6 is a flow chart of the processing for collecting routing information for 31 seconds from the startup of the network processing unit in the first and second embodiments of the present invention. The figure will be used to explain the processing in the above case.

At step S1, it is determined if the network processing unit 23 (11$a$, 11$b$, 11$e$) has started up. If the network processing unit has started up, then at step S2 the timer is set to 31 seconds.

At step S3, the routing information is collected. At step S4, it is determined if the timer has reached 0. When the timer has not reached 0, the routine returns to step S3, where the routing information is collected.

When the timer reaches 0, then at step S5 the collected routing information is written into the routing table 11$e$ to set the static routing information.

FIG. 7 is a view of a third embodiment of the present invention. This embodiment provides an optimum route discriminating unit 11$j$ for discriminating the optimum route from the received rip information and a default generating unit 11$k$ for generating default routing information based on the optimum route information discriminated by the optimum route discriminating unit 11$j$. The collection and the setting of the routing information can be performed in the same way as in the first or second embodiment.

The IP network can connect networks in a grid manner, but the majority of the networks are leaf networks (end networks) with only one gateway to other networks. Further, networks of users connected to personal computers etc. are almost never connected to two or more other networks. There is no problem with assuming them all to be leaf networks.

For example, in the network of the configuration shown in FIG. 1, the network constituted by the LAN 100 is a leaf network. The workstation 100$a$ and personal computer 100$b$ connected to the LAN 100 have only one gateway, 101$c$, to another network.

Here, in the first and second embodiments, the rip information read out by the routing information collecting unit 11$f$ does not necessarily have to contain the destination information to all the networks. Further, when the destination information to all the networks is contained, the routing table ends up becoming large.

In this case, if it were possible to set a suitable default route, it would be possible to reduce the size of the routing table. Also, if such a suitable default route could be set, it would be possible to reach even a network whose rip information was not contained by the destination information after the destination information reached that network.

From the above viewpoint, the optimum route discriminating unit 11$j$ in the third embodiment discriminates the optimum route from the rip information it receives. The following may be considered as the method of discriminating the optimum route:

<1> When the received rip information is sent from only one gateway, deeming that to be the only gateway and determining the route to that gateway to be the optimum route.

For example, in the above-mentioned FIG. 1, in the workstation 100$a$ and personal computer 100$b$ connected to the LAN 100, the rip information is sent from only the single gateway 101$c$, so the route to the gateway 101$c$ is deemed the optimum route.

<2> When the received rip information comes from a plurality of gateways, the gateway with the most entries, that is, the one with the greatest amount of information, is deemed to be the optimum gateway and the route passing through that gateway is determined to be the optimum route.

For example, in the above-mentioned FIG. 1, in the workstation 101$a$ and personal computer 101$b$ connected to the LAN 101, the rip information came from the gateways 102$c$, 103$c$, and 101$c$. Among these, the gateway with the most entries, that is, the gateway with the greatest number of networks connected to it (for example, the gateway 103$c$ in the case of connection of the gateway 103$c$ to a national network) is deemed as the optimum gateway and the route through that gateway is deemed the optimum route.

If the optimum route is determined in the optimum route discriminating unit 11$j$, the default generating unit 1$k$ generates the default routing information based on the optimum routing information and the setting unit 11$g$ registers the default routing information in the routing table.

For example, when the IP address of the optimum gateway determined at the optimum gateway discriminating unit 11*j* is (133.160.39.1), the default routing information generated at the default generating unit 11*k* becomes as follows:

| 0.0.0.0 | 133.160.39.1 | 2 |
|---------|--------------|---|

Here, the above "0.0.0.0" shows that the routing information is the default one, the "133.160.39.1" shows the IP address of the gateway, and "2" shows the number of hops indicating the number of gateways passed through to reach the network. The number of hops is one indicator of the "cost".

FIGS. 8A, 8B, and 8C are flow charts of the processing in the third embodiment of the present invention. These figures show the processing in the case of collecting routing information for 31 seconds from the startup of the network processing unit in the same way as the flow chart shown in FIG. 6. The third embodiment will be explained with reference to these figures.

At step S1 of FIG. 8A, like with FIG. 6, it is determined if the network processing unit has started up. If the network processing unit has started up, the timer is set to 31 seconds at step S2.

At step S3, the routing information is collected. At step S4, it is judged if the timer has reached 0. If the timer has not reached 0, the routine returns to step S3, where the routing information is collected.

If the timer reaches 0, the routine proceeds to step S5 in FIG. 8B, where it is determined if there is a gateway giving the routing information including the default route. When there is, then at step S6, just the default route is extracted. Then, the routine proceeds to step S11, where the collected routing information is written into the routing table 11*e* and the static routing information is set.

Further, when there is no gateway giving the routing information including the default route, the routine proceeds to step S7 (FIG. 8B), where it is determined if the routing information is given from only one gateway. In this case, the routine proceeds to step S8 (FIG. 8B) where the gateway is used as the optimum gateway. Further, if the routing information is given from a plurality of gateways, at step S9, the routing information appearing most frequently is used as the optimum gateway.

Next, at step S10 of FIG. 8C, the default route is created based on the address of the optimum gateway determined at steps S8 and S9 of FIG. 8B. At step S11, the static routing information is set.

Note that in the above embodiments, the information collected by the routing information collecting unit 11*f* is directly written in the routing table 11*e*, but the present invention is not limited to these embodiments. It may also be configured so that the information collected by the routing information collecting unit 11*f* is registered in a file of a static route information data base 21*f* etc. shown in FIG. 2, prepared in advance for registering the static routing information manually, and loading the routing information written in the file into the routing table 11*e* when the network processing unit 23 of the personal computer 11 is started up.

By this, it is possible to determine what the automatically set static routing is like by looking at the content of the file.

Further, in the above embodiments, provision was made of an information collection timing determining unit and an information collection completion determining unit to determine the timing of collection of the routing information and completion of collection of the routing information, but these are not essential in the present invention. In the present invention, the point is that the routing information flowing in the network be collected and set in the routing table and a static routing information be automatically produced.

Figure 9:
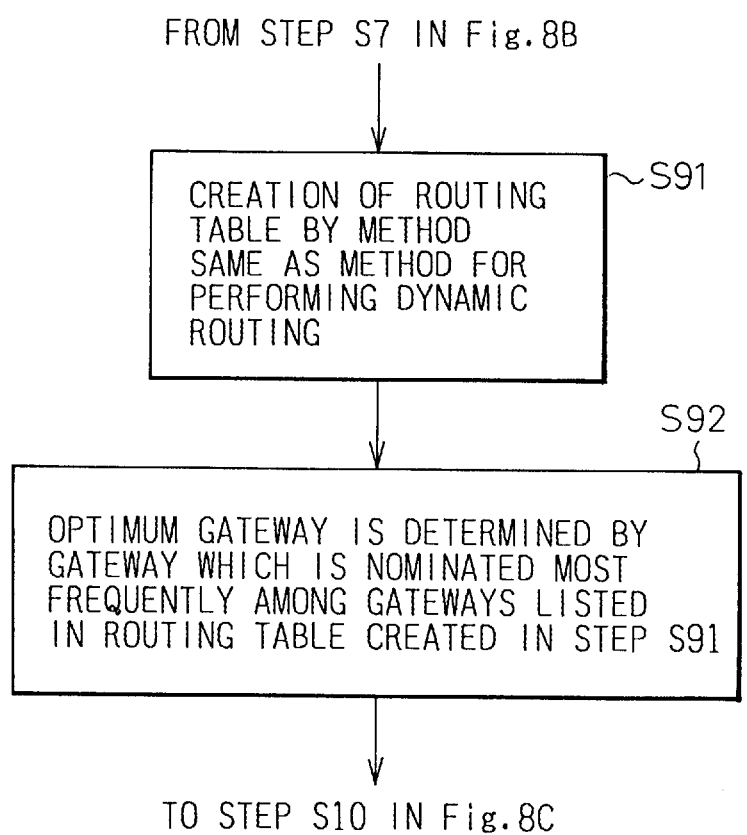
FIG. 9 is a view of a modification of step S9 shown in FIG. 8B.

FIG. 9 is a view of a modification of step S9 shown in FIG. 8B.

In FIG. 9, at step S91, a routing table is formed in accordance with the same type of method of formation of a routing table as usual, that is, as with setting of dynamic routing information.

At step S92, the gateway among those gateways appearing in the routing table formed at step S91 which has the greatest frequency of appearance is used as the optimum gateway.

The following data is considered obtained relating to the three gateways GW1, GW2, and GW3 when showing step S91 in FIG. 9 in more detail.

| rip | No. of hops |
|-----|-------------|
| [GW1] | |
| LAN-A | 3 |
| LAN-B | 2 |
| LAN-C | 8 |
| LAN-E | 1 |
| [GW2] | |
| LAN-A | 2 |
| LAN-B | 5 |
| LAN-D | 2 |
| [GW3] | |
| DEFAULT | 2 |

From the above data, the routing table sought for becomes as follows:

| rip | Gateway | No. of hops |
|-----|---------|-------------|
| LAN-A | GW2 | 2 |
| LAN-B | GW1 | 2 |
| LAN-C | GW1 | 8 |
| LAN-D | GW2 | 2 |
| LAN-E | GW1 | 1 |
| DEFAULT | GW3 | 2 |

From this routing table, the entry of GW1 is 3, the entry of GW2 is 2, and the entry of GW3 is 1. The optimum gateway is determined to be GW1. Further, the default generating unit 11*k* (FIG. 7) uses GW1 as the default in this case.

Figure 10:
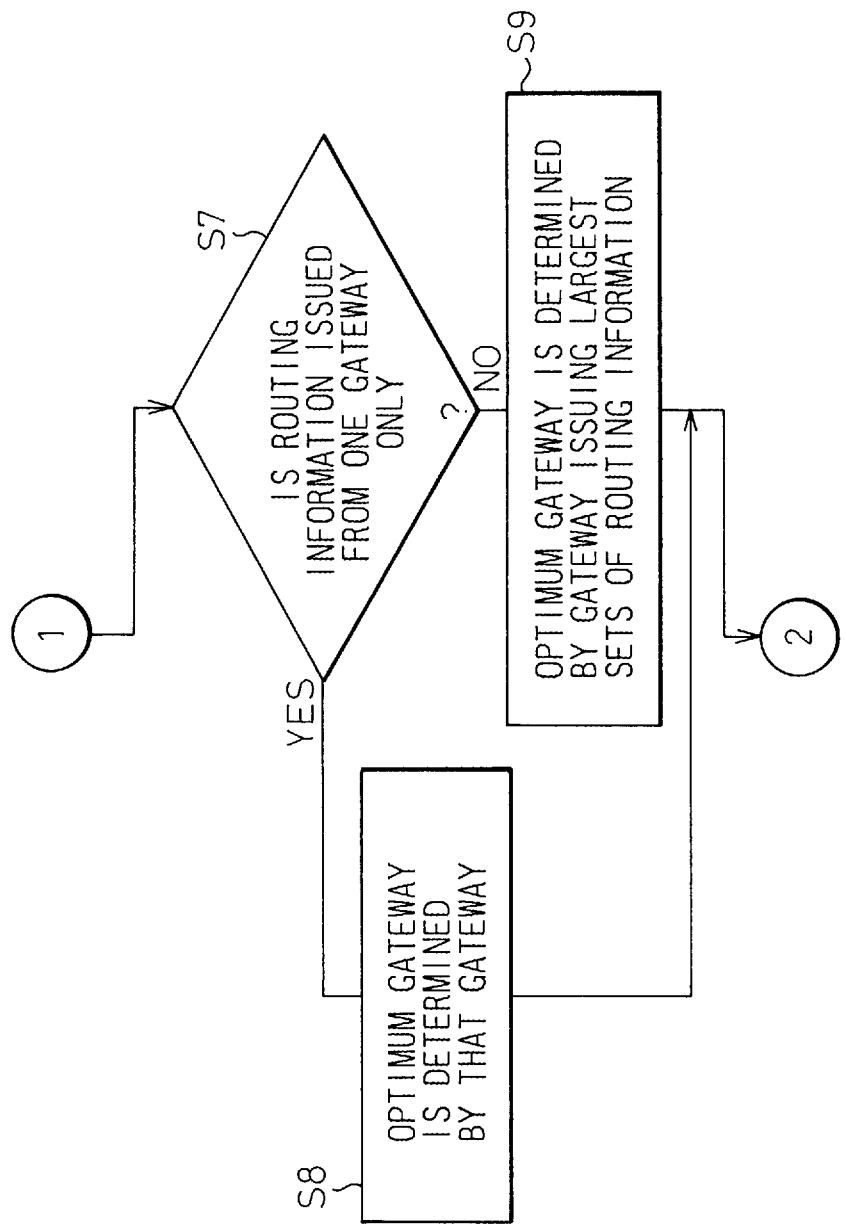
FIG. 10 is a view of a first modification of FIG. 8B.

FIG. 10 is a view of a first modification of FIG. 8B. It is a flow chart in the case where no default is considered.

Figure 11:
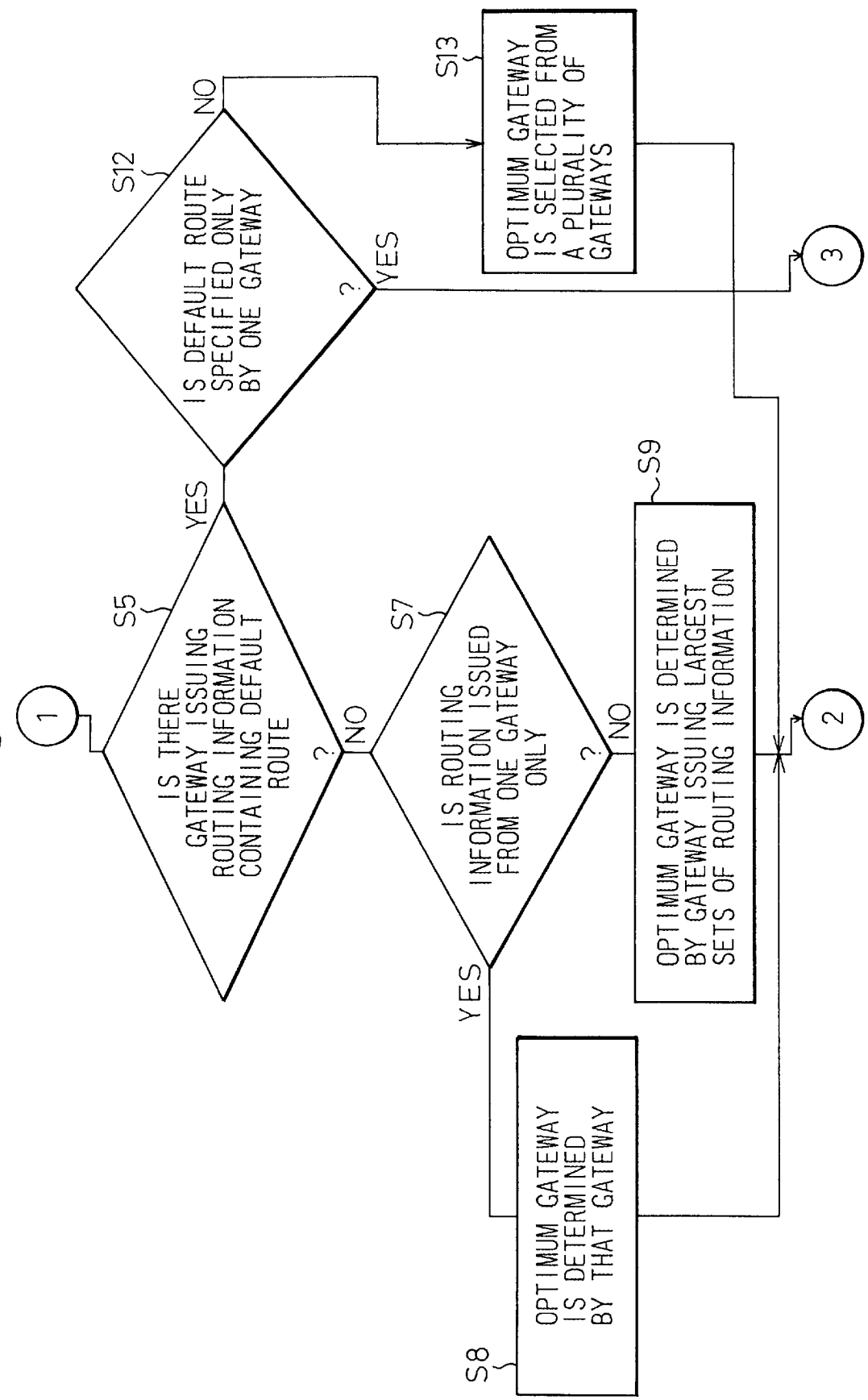
FIG. 11 is a view of a second modification of FIG. 8B.

FIG. 11 is a view of a second modification of FIG. 8B and adds steps S12 and S13 to the flow chart of FIG. 8B.

At step S12, it is checked if there is a default route from only one gateway.

At step S13, when it is determined that there are default routes from a plurality of gateways, the optimum gateway among them is selected. Note that the method of selection is to use the flow chart of FIG. 9.

Figure 12:
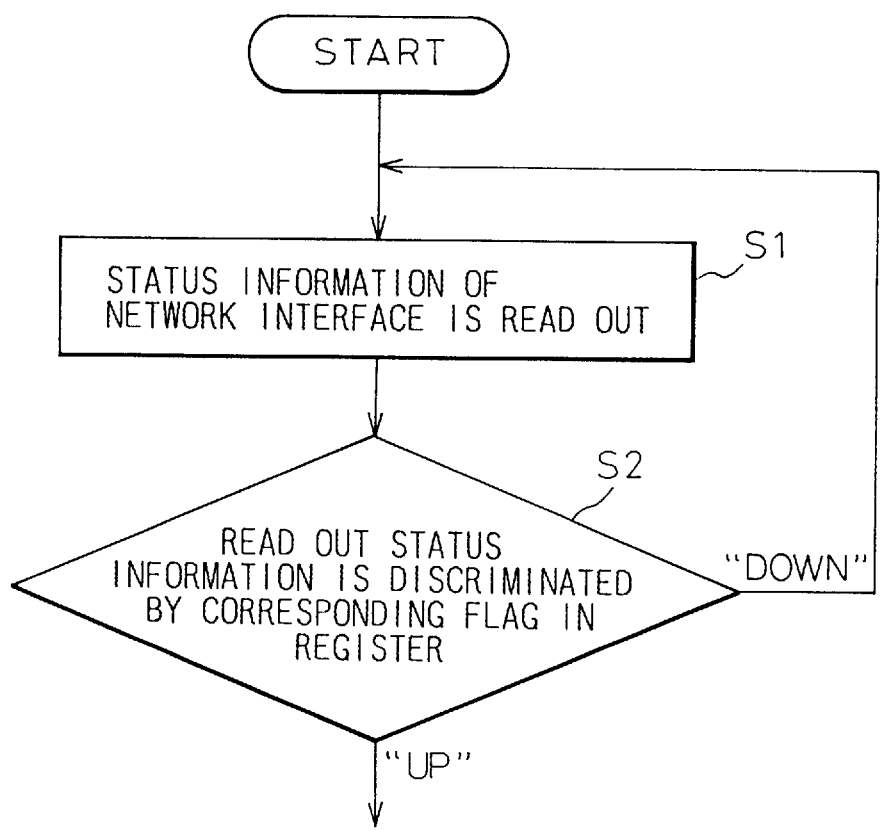
FIG. 12 is a flow chart of the case of expressing the information collection timing determining unit 1$h$ by software.

FIG. 12 is a flow chart of the case of expressing the information collection timing determining unit 1*h* by software, Note that the flow chart of FIG. 12 corresponds to step S1 shown in FIG. 6.

In FIG. 12, at step Si, the network interface or status information is read into the network processing unit.

At step S2, the status information designated at step S1 is judged by the corresponding flag in the status flag register. When the flag is "up", the network processing unit starts up.

Next, looking at the information collection completion determining unit 1*i*, the flow chart of the case of expressing this by software corresponds to steps S2 and S4 in FIG. 6.

Figure 13:
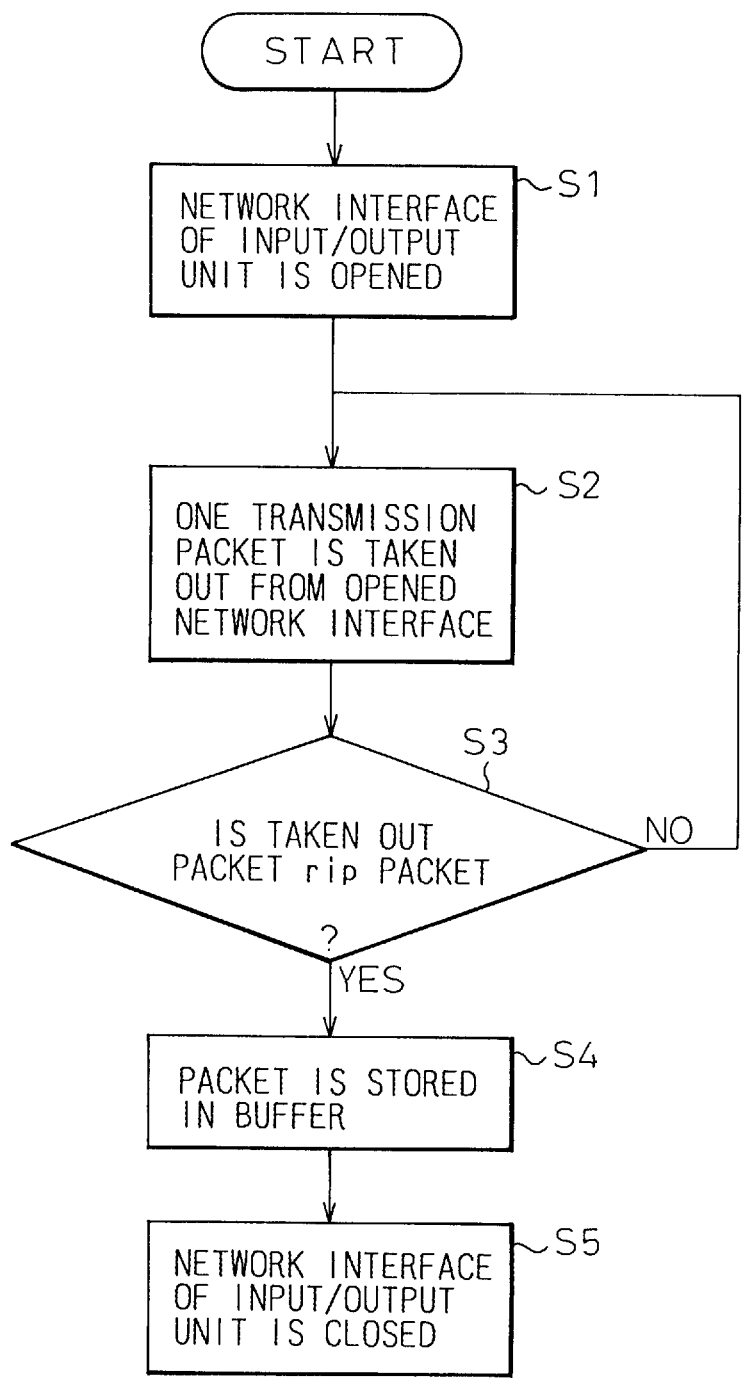
FIG. 13 is a flow chart of the case of expressing the routing information collecting unit 1$f$ by software.

FIG. 13 is a flow chart of the case of expressing the routing information collecting unit 1f by software.

At step S1, the network interface of the input/output unit 1a is opened.

At step S2, one transmission packet is read from the opened interface.

At step S3, it is checked if the fetched packet is a rip packet.

At step S4, if it is a rip packet, the packet is stored in a buffer (for example, a RAM). This is later sent to the optimum route descriminating unit 1j.

At step S5, the network interface of the input/output unit 10a opened at step S1 is closed.

Figure 14B:
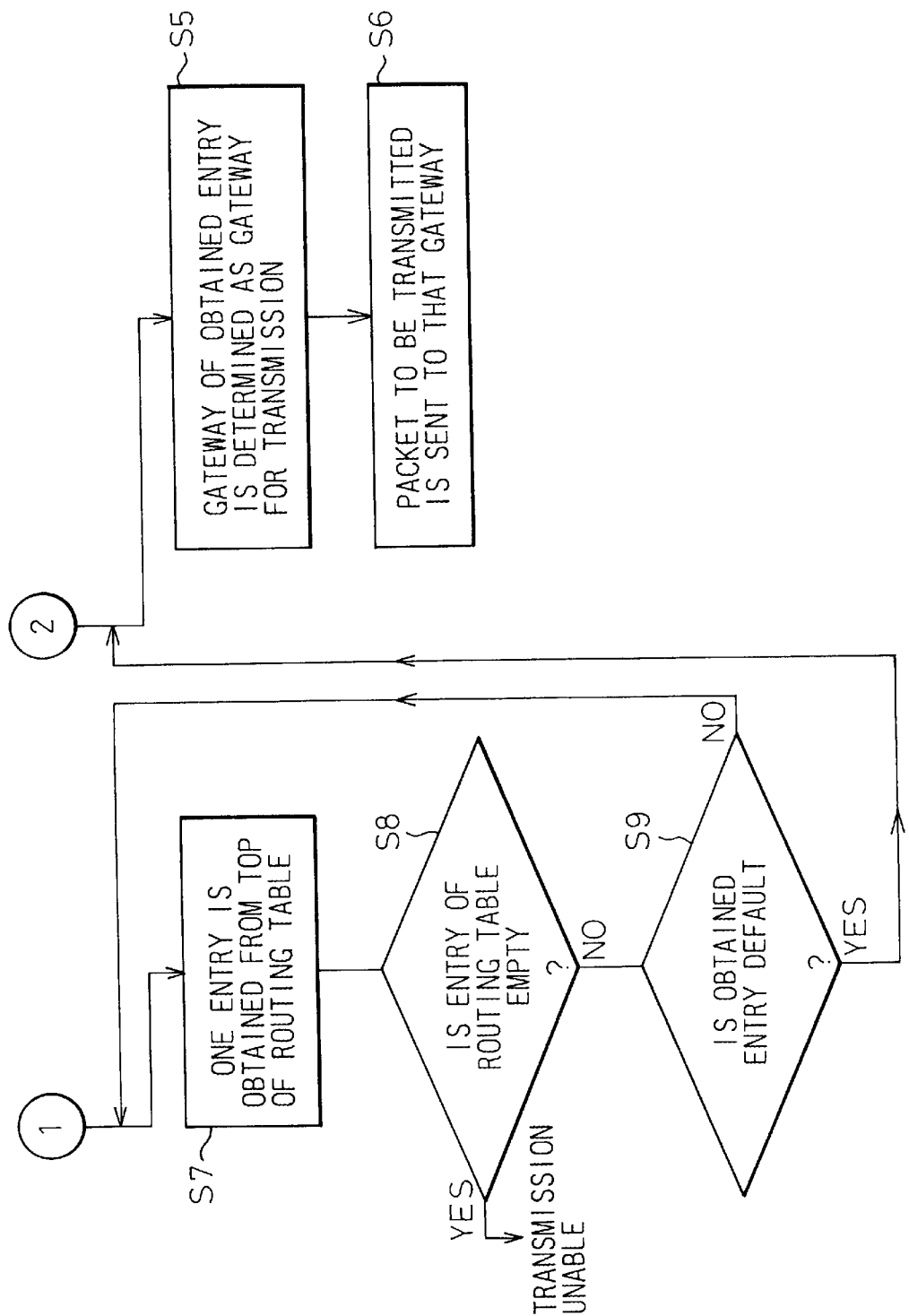

FIG. 14A and 14B are flow charts of the case of expressing the routing unit 1b by software.

At step S1, the destination address of the transmission packet is extracted.

At step S2, one entry is selected from the routing table 1e.

At step S3, it is checked if the entry in the routing table 1e is empty.

At step S4, it is checked if the destination of the acquired entry includes the destination address of the packet.

At step S5 (FIG. 14B), the gateway of the obtained entry is determined as the gateway to the destination of transmission.

At step S6, the packet to be transmitted is sent to the gateway.

At step S7, when it is judged at step S3 that the entry of the routing table is empty, one entry is obtained from the beginning of the routing table.

At step S8, it is checked if the entry of the routing table is empty. If the entry is empty, packet transmission is not possible.

At step S9, if the obtained entry is for default, the routine proceeds to step S5.

As explained above, in the present invention, provision is made of a routing information collecting unit and a setting unit. The routing information flowing in the network is collected and set in the routing table by the routing information collecting unit. By this, the routing table is produced automatically. Therefore, the setting of the static routing information can be automatically performed without human intervention. Further, the routing information can be set with the same degree of flexibility as when setting dynamic routing information without applying to the computer the load of setting of dynamic routing information.

Further, by provision of an information collection timing determining unit, it is possible to collect the routing information at a suitable timing. Further, by providing the information collection completion determining unit, there is no time wasted such as due to the startup time of the network processing unit becoming longer or the same information being fetched several times. Further, there is no failure in the collection of the necessary routing information.

Still further, by providing an optimum route discriminating unit and a default generating unit, determining the optimum route, and default generating routing information from the determined routing information, it is possible to reduce the size of the routing table.

We claim:

1. A computer connected to a local network and coupled via the local network and gateways to other networks of other computers, comprising:

an automatic setting unit to store static routing information in a routing table for communication between said computer and the other computers by routing in accordance with the static routing information in the routing table;

a routing information collecting unit to intermittently collect dynamic routing information, flowing in the local network and issued by at least one of the gateways, for storage as the static routing information in the routing table by said automatic setting unit;

an optimum route discriminating unit, coupled to said routing information collecting unit, to determine from the dynamic routing information for each of the other networks a single optimum gateway connecting each of the other networks to the network to which said computer is connected; and a default generating unit, coupled to said optimum route discriminating unit and said automatic setting unit, to generate a table of default routing information based on the determined optimum gateway for each of the other networks.

2. A computer as set forth in claim 1, further comprising an information collection timing determining unit to determine timing of collection of the dynamic routing information to be stored as the static routing information in the routing table.

3. A computer as set forth in claim 2, further comprising an information collection completion determining unit to determine completion of the collection of the dynamic routing information to be stored as the static routing information in the routing table.

4. A computer as set forth in claim 3, wherein the information collection completion determining unit either <1> collects the dynamic routing information for a time just slightly longer than a 30 second transmission interval of routing information protocol (rip) information or <2> waits until just one rip packet is read and then ends the collection of the dynamic routing information.

5. A computer as set forth in claim 3, wherein said optimum route discriminating unit, upon receipt of rip information from only one gateway, deems the only one gateway to be the single optimum gateway and a first route thereto to be an optimum routes, and upon receipt of the rip information from a plurality of gateways, deems a prolific gateway providing a greatest amount of information to be the single optimum gateway and a second route passing through the prolific gateway to be the optimum route.

6. A computer as set forth in claim 2, wherein said information collection timing determining unit starts collecting the dynamic routing information when at least one of the following three conditions occurs: <1> power is supplied to said computer <2> a network interface of said computer is started up, and <3> the network is disconnected from said computer and a signal showing the network is alive is interrupted and then the network is again connected to said computer and the signal showing that the network is alive is again detected.

7. A computer as set forth in claim 2, wherein said optimum route discriminating unit, upon receipt of rip information from only one gateway, deems the only one gateway to be the single optimum gateway and a first route thereto to be an optimum route, and upon receipt of the rip information from a plurality of gateways, deems a prolific gateway providing a greatest amount of information to be the single optimum gateway and a second route passing through the prolific gateway to be the optimum route.

8. A computer as set forth in claim 1, further comprising an information collection completion determining unit to determine completion of collection of the dynamic routing information to be stored as the static routing information in the routing table.

9. A computer as set forth in claims 8, wherein the information collection completion determining unit either <1> collects the dynamic outing information for a time just slightly longer than a 30 second transmission interval of routing information protocol (rip) information or <2> waits until just one rip packet is read and then ends the collection of the dynamic routing information.

10. A computer as set forth in claim 8, wherein said optimum route discriminating unit upon receipt of rip information from only one gateway, deems the only one gateway to be the single optimum gateway and a first route thereto to be an optimum route, and upon receipt of the rip information from a plurality of gateways, deems a prolific gateway providing a greatest amount of information to be the single optimum gateway and a second route passing through the prolific gateway to be the optimum route.

11. A computer as set forth in claim 1, wherein said optimum route discriminating unit, upon receipt of route information protocol information from only one gateway, deems the only one gateway as the single optimum gateway and determines a first route to the only one gateway to be an optimum route, and upon receipt of the route information protocol information from a plurality of gateways, deems a prolific gateway, from which a greatest amount of route information protocol information was received, to be the single optimum gateway and determines a second route passing through the prolific gateway to be the optimum route.

12. A computer for setting and maintaining a routing table for communicating with a computer network connected to the computer and to other networks via at least one gateway, comprising:

an input/output interface establishing communications between said computer and the computer network;

a routing information collection unit receiving and intermittently collecting dynamic routing information via the input/output interface; and a routing computation unit storing network routing data in a routing table based on the dynamic routing information, said routing computation unit including:

an optimum route discriminating unit receiving the dynamic routing information from said routing information collection unit to determine an optimum route using the at least one gateway when only one gateway is connected between said computer and the computer network; and a default generating unit storing default routing information based on the optimum route as the network routing data for the routing table.

13. A computer for routing, comprising:

a monitoring function intermittently collecting dynamic routing information of a computer network configured as local area networks connected via at least one gateway; and a routing table updating function for dynamically updating a routing table with an optimum route based on hop data contained within the dynamic routing information said routing table updating function including:

an optimum route discriminating function receiving the dynamic routing information from said monitoring function to determine the optimum route by determining a prolific gateway from which a greatest amount of dynamic routing information is received; and default generating function generating default routing information based on the optimum route and storing the default routing information in the routing table.

14. A routing computation unit for a local computer connected to a local network and coupled via the local network and gateways to other networks of remote computers, the local computer including an automatic setting unit to store static routing information in a routing table for communication between the local computer and the remote computers by routing in accordance with the static routing information in the routing table, and a routing information collecting unit to intermittently collect dynamic routing information, flowing in the local network and issued by at least one of the gateways, for storage as the static routing information in the routing table by the automatic setting unit, said routing computation unit comprising:

an optimum route discriminating unit, coupled to the routing information collecting unit, to determine from the dynamic routing information for each of the other networks a single optimum gateway connecting each of the other networks to the network to which the local computer is connected; and a default generating unit, coupled to said optimum route discriminating unit and the automatic setting unit, to generate a table of default routing information based on the determined optimum gateway for each of the other networks.

* * * * *

UNITED STATES PATENT AND TRADEMARK OFFICE
CERTIFICATE OF CORRECTION

PATENT NO.: 5,884,047
DATED : March 16, 1999
INVENTOR(S): Hideyuki AIKAWA et al.

It is certified that error appears in the above-identified patent and that said Letters Patent is hereby corrected as shown below:

On the title page, [73] Assignee, change "Kanagawa" to --Kawasaki--.

Col. 1, line 8, begin a new paragraph with "1. Field".

Col. 8, line 62, change "1K" to --11K--;

Col. 10, line 58, change "," to --.--;
line 60, change "Si" to --S1--.

Col. 11, line 2, change "if" to --1f--;
line 12, change "10a" to --1a--.

Col. 12, line 39, change "routes" to --route--.

Col. 13, line 23, begin a new paragraph with "upon".

Col. 14, line 14, after "information" insert --,--.

Signed and Sealed this

Fifth Day of December, 2000

Attest:

Attesting Officer

Q. TODD DICKINSON
Director of Patents and Trademarks